(12) United States Patent  (10) Patent No.: US 9,210,529 B2
Huang et al.  (45) Date of Patent: Dec. 8, 2015

(54) LOCATION-BASED APPLICATION PROGRAM MANAGEMENT

(71) Applicant: Apple Inc., Cupertino, CA (US)

(72) Inventors: Ronald Keryuan Huang, San Jose, CA (US); Morgan Grainger, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/137,607

(22) Filed: Dec. 20, 2013

(65) Prior Publication Data

US 2014/0113613 A1  Apr. 24, 2014

Related U.S. Application Data

(62) Division of application No. 12/755,802, filed on Apr. 7, 2010, now Pat. No. 8,620,344.

(51) Int. Cl.
*H04M 3/00* (2006.01)
*H04W 4/00* (2009.01)
(Continued)

(52) U.S. Cl.
CPC ............... *H04W 4/001* (2013.01); *H04W 4/02* (2013.01); *H04W 4/026* (2013.01); *H04W 64/00* (2013.01);
(Continued)

(58) Field of Classification Search
CPC ..... G01S 13/84; G01S 2013/466; G01S 5/02; H04B 7/0608; H04B 7/0613; H04B 7/0814; H04B 7/0837; H04L 63/0492; H04L 63/06; H04L 63/10; H04L 63/20; H04L 63/0281; H04L 63/0876; H04L 63/105; H04L 67/125; H04W 48/04; H04W 84/12; H04W 88/085; H04W 52/283; H04W 52/288

USPC ....................... 455/418, 419, 456.1
See application file for complete search history.

(56) References Cited

U.S. PATENT DOCUMENTS 5,394,158 A  2/1995  Chia
5,412,388 A  5/1995  Attwood
(Continued)

FOREIGN PATENT DOCUMENTS

CN  101667208  3/2010
EP  1 843 524  10/2007
(Continued)

OTHER PUBLICATIONS

"Part 11: Wireless LAN Medium Access Control (MAC) and Physical Layer (PHY) specifications: Higher-Speed Physical Layer Extension in the 2.4 GHz Band", IEEE Std 802.11a, 1999.
(Continued)

*Primary Examiner* — Nimesh Patel
(74) *Attorney, Agent, or Firm* — Fish & Richardson P.C.

(57) ABSTRACT

Methods, program products, and systems for location-based application program management are described. A mobile device can receive a first application program to be executed in an application subsystem. The first application program can be configured to be invoked or notified when the mobile device is located at a defined location. The mobile device can register the first application program to a second application program that executes in a baseband subsystem. The mobile device can set the application subsystem to a power-saving operating mode. The second application program can monitor a current location of the mobile device. When the mobile device is currently located at the defined location, the second application program can set the application subsystem to an active operating mode, and invoke the first application program.

12 Claims, 11 Drawing Sheets

(51) Int. Cl.
*H04W 4/02* (2009.01)
*H04W 64/00* (2009.01)
*H04W 4/04* (2009.01)
*H04W 8/26* (2009.01)
*H04W 48/16* (2009.01)
*H04W 60/00* (2009.01)
*H04W 88/16* (2009.01)

(52) U.S. Cl.
CPC . *H04W 4/04* (2013.01); *H04W 8/26* (2013.01); *H04W 48/16* (2013.01); *H04W 60/00* (2013.01); *H04W 88/16* (2013.01); *Y02B 60/50* (2013.01)

(56) References Cited

U.S. PATENT DOCUMENTS

| | | |
|---|---|---|
| 5,444,450 A | 8/1995 | Olds et al. |
| 5,493,286 A | 2/1996 | Grube et al. |
| 5,508,707 A | 4/1996 | LeBlanc et al. |
| 5,519,760 A | 5/1996 | Borkowski et al. |
| 5,539,924 A | 7/1996 | Grube et al. |
| 5,570,412 A | 10/1996 | LeBlanc |
| 5,642,303 A | 6/1997 | Small et al. |
| 5,802,468 A | 9/1998 | Gallant et al. |
| 5,913,170 A | 6/1999 | Wortham |
| 5,945,944 A | 8/1999 | Krasner |
| 5,945,948 A | 8/1999 | Buford et al. |
| 6,122,520 A | 9/2000 | Want et al. |
| 6,232,915 B1 | 5/2001 | Dean et al. |
| 6,236,861 B1 | 5/2001 | Naor et al. |
| 6,269,246 B1 | 7/2001 | Rao et al. |
| 6,278,936 B1 | 8/2001 | Jones |
| 6,321,092 B1 | 11/2001 | Fitch et al. |
| 6,363,255 B1 | 3/2002 | Kuwahara |
| 6,424,840 B1 | 7/2002 | Fitch et al. |
| 6,445,937 B1 | 9/2002 | daSilva |
| 6,625,457 B1 | 9/2003 | Raith |
| 6,947,880 B2 | 9/2005 | Johnson et al. |
| 7,072,666 B1 * | 7/2006 | Kullman et al. ............ 455/456.1 |
| 7,076,258 B2 | 7/2006 | Motegi et al. |
| 7,120,459 B2 | 10/2006 | Sawada et al. |
| 7,127,257 B2 | 10/2006 | Riley et al. |
| 7,133,685 B2 | 11/2006 | Hose et al. |
| 7,209,753 B2 | 4/2007 | Raith |
| 7,305,245 B2 | 12/2007 | Alizadeh-Shabdiz et al. |
| 7,346,359 B2 | 3/2008 | Damarla et al. |
| 7,403,762 B2 | 7/2008 | Morgan et al. |
| 7,414,988 B2 | 8/2008 | Jones et al. |
| 7,433,693 B2 | 10/2008 | Sheynblat |
| 7,433,694 B2 | 10/2008 | Morgan et al. |
| 7,457,628 B2 | 11/2008 | Blumberg et al. |
| 7,471,954 B2 | 12/2008 | Brachet et al. |
| 7,474,897 B2 | 1/2009 | Morgan et al. |
| 7,478,578 B2 | 1/2009 | Kirkpatrick |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz et al. |
| 7,528,772 B2 | 5/2009 | Ruutu et al. |
| 7,551,579 B2 | 6/2009 | Alizadeh-Shabdiz et al. |
| 7,551,929 B2 | 6/2009 | Alizadeh-Shabdiz et al. |
| 7,576,692 B2 | 8/2009 | Sairo et al. |
| 7,587,205 B1 | 9/2009 | Odorfer et al. |
| 7,664,511 B2 | 2/2010 | Wang et al. |
| 7,769,396 B2 | 8/2010 | Alizadeh-Shabdiz et al. |
| 7,818,017 B2 | 10/2010 | Alizadeh-Shabdiz et al. |
| 7,974,642 B2 | 7/2011 | Lin et al. |
| 8,050,686 B1 | 11/2011 | Souissi et al. |
| 8,145,255 B2 | 3/2012 | Rekimoto |
| 8,200,251 B2 | 6/2012 | Huang |
| 8,433,334 B2 | 4/2013 | Huang et al. |
| 2002/0067308 A1 * | 6/2002 | Robertson ................ 342/357.17 |
| 2002/0168988 A1 | 11/2002 | Younis |
| 2003/0060213 A1 | 3/2003 | Heinonen et al. |
| 2003/0069683 A1 | 4/2003 | Lapidot et al. |
| 2003/0087647 A1 | 5/2003 | Hurst |
| 2004/0072577 A1 | 4/2004 | Myllymaki et al. |
| 2004/0176107 A1 * | 9/2004 | Chadha ...................... 455/456.5 |
| 2004/0203845 A1 | 10/2004 | Lal |
| 2005/0040968 A1 | 2/2005 | Damarla et al. |
| 2005/0075119 A1 | 4/2005 | Sheha et al. |
| 2005/0096084 A1 | 5/2005 | Pohja et al. |
| 2005/0239478 A1 | 10/2005 | Spirito |
| 2006/0009152 A1 | 1/2006 | Millard et al. |
| 2006/0030333 A1 * | 2/2006 | Ward et al. .................. 455/456.1 |
| 2006/0068812 A1 * | 3/2006 | Carro et al. ................. 455/456.3 |
| 2006/0085419 A1 | 4/2006 | Rosen |
| 2006/0095348 A1 | 5/2006 | Jones et al. |
| 2006/0095349 A1 | 5/2006 | Morgan et al. |
| 2006/0106850 A1 | 5/2006 | Morgan et al. |
| 2006/0148466 A1 | 7/2006 | Brethereau et al. |
| 2006/0172737 A1 | 8/2006 | Hind et al. |
| 2006/0200843 A1 | 9/2006 | Morgan et al. |
| 2006/0211444 A1 | 9/2006 | Koike |
| 2006/0217130 A1 | 9/2006 | Rowitch et al. |
| 2006/0217131 A1 | 9/2006 | Alizadeh-Shabdiz et al. |
| 2006/0234639 A1 | 10/2006 | Kushwaha et al. |
| 2006/0240840 A1 | 10/2006 | Morgan et al. |
| 2006/0264222 A1 | 11/2006 | Cole et al. |
| 2007/0002813 A1 | 1/2007 | Tenny et al. |
| 2007/0004427 A1 | 1/2007 | Morgan et al. |
| 2007/0004428 A1 | 1/2007 | Morgan et al. |
| 2007/0004454 A1 | 1/2007 | Schweiger et al. |
| 2007/0008925 A1 | 1/2007 | Dravida et al. |
| 2007/0010261 A1 | 1/2007 | Dravida et al. |
| 2007/0066322 A1 | 3/2007 | Bahl |
| 2007/0121560 A1 | 5/2007 | Edge |
| 2007/0155307 A1 | 7/2007 | Ng et al. |
| 2007/0203647 A1 | 8/2007 | Mizouchi et al. |
| 2007/0207816 A1 | 9/2007 | Spain |
| 2007/0287473 A1 | 12/2007 | Dupray |
| 2007/0290924 A1 | 12/2007 | McCoy |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008120 A1 | 1/2008 | Alizadeh-Shabdiz |
| 2008/0008121 A1 | 1/2008 | Alizadeh-Shabdiz |
| 2008/0036661 A1 | 2/2008 | Smith et al. |
| 2008/0057955 A1 | 3/2008 | Choi-Grogan |
| 2008/0117201 A1 | 5/2008 | Martinez et al. |
| 2008/0123608 A1 | 5/2008 | Edge et al. |
| 2008/0132170 A1 | 6/2008 | Alizadeh-Shabdiz et al. |
| 2008/0139217 A1 | 6/2008 | Alizadeh-Shabdiz et al. |
| 2008/0171556 A1 | 7/2008 | Carter |
| 2008/0176583 A1 | 7/2008 | Brachet et al. |
| 2008/0186882 A1 | 8/2008 | Scherzer et al. |
| 2008/0225779 A1 | 9/2008 | Bragiel et al. |
| 2008/0259885 A1 | 10/2008 | Faulkner et al. |
| 2009/0005077 A1 | 1/2009 | Forstall et al. |
| 2009/0005080 A1 | 1/2009 | Forstall et al. |
| 2009/0005981 A1 | 1/2009 | Forstall et al. |
| 2009/0061870 A1 | 3/2009 | Finkelstein et al. |
| 2009/0067420 A1 | 3/2009 | Ganesan et al. |
| 2009/0070038 A1 | 3/2009 | Geelen et al. |
| 2009/0075672 A1 | 3/2009 | Jones et al. |
| 2009/0088183 A1 | 4/2009 | Piersol et al. |
| 2009/0132652 A1 | 5/2009 | Athale et al. |
| 2009/0149197 A1 | 6/2009 | Morgan et al. |
| 2009/0154371 A1 | 6/2009 | Alizadeh-Shabdiz et al. |
| 2009/0175189 A1 | 7/2009 | Alizadeh-Shabdiz et al. |
| 2009/0181672 A1 | 7/2009 | Horn et al. |
| 2009/0227270 A1 | 9/2009 | Naaman |
| 2009/0234876 A1 | 9/2009 | Schigel et al. |
| 2009/0252138 A1 | 10/2009 | Alizadeh-Shabdiz et al. |
| 2009/0275341 A1 | 11/2009 | Monnes et al. |
| 2009/0280801 A1 | 11/2009 | Malik |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303120 A1 | 12/2009 | Alizadeh-Shabdiz |
| 2009/0303121 A1 | 12/2009 | Alizadeh-Shabdiz |
| 2009/0310585 A1 | 12/2009 | Alizadeh-Shabdiz |
| 2009/0310658 A1 | 12/2009 | Garg et al. |

(56) References Cited

U.S. PATENT DOCUMENTS

| | | |
|---|---|---|
| 2009/0312035 A1 | 12/2009 | Alizadeh-Shabdiz et al. |
| 2009/0312036 A1 | 12/2009 | Alizadeh-Shabdiz et al. |
| 2010/0099438 A1 | 4/2010 | Oh |
| 2010/0156713 A1 | 6/2010 | Harper |
| 2010/0234045 A1 | 9/2010 | Karr et al. |
| 2010/0240369 A1 | 9/2010 | Law et al. |
| 2010/0255856 A1 | 10/2010 | Kansal et al. |
| 2010/0317390 A1 | 12/2010 | Rekimoto |
| 2011/0047368 A1 | 2/2011 | Sundaramurthy et al. |
| 2011/0165892 A1 | 7/2011 | Ristich et al. |
| 2011/0176494 A1 | 7/2011 | Huang et al. |
| 2011/0176523 A1 | 7/2011 | Huang et al. |
| 2011/0177825 A1 | 7/2011 | Huang |
| 2011/0177826 A1 | 7/2011 | Huang et al. |
| 2011/0177831 A1 | 7/2011 | Huang |
| 2011/0177832 A1 | 7/2011 | Huang |
| 2011/0249668 A1 | 10/2011 | Milligan et al. |
| 2011/0250903 A1 | 10/2011 | Huang et al. |
| 2011/0252422 A1 | 10/2011 | Rothert et al. |
| 2011/0252423 A1 | 10/2011 | Freedman et al. |
| 2011/0252429 A1 | 10/2011 | Ballard et al. |
| 2011/0252430 A1 | 10/2011 | Chapman et al. |
| 2011/0287737 A1 | 11/2011 | Jones |
| 2012/0052835 A1 | 3/2012 | Bull et al. |
| 2012/0171989 A1 | 7/2012 | Matsuo et al. |

FOREIGN PATENT DOCUMENTS

| | | |
|---|---|---|
| EP | 2 063 623 | 5/2009 |
| EP | 2 110 684 | 10/2009 |
| JP | 2005-277507 | 10/2005 |
| WO | WO 00/17803 | 3/2000 |
| WO | WO 2007/147451 | 12/2007 |
| WO | WO 2008/126959 | 10/2008 |
| WO | WO 2009/059964 | 5/2009 |
| WO | WO 2009/070138 | 6/2009 |
| WO | WO 2009/089308 | 7/2009 |
| WO | WO 2010/129094 | 11/2010 |
| WO | WO 2011/087529 | 7/2011 |

OTHER PUBLICATIONS

"Part 16: Air Interface for Fixed Broadbank Wireless Access Systems", IEEE Std 802.16, 2004.

International Search Report and Written Opinion in PCT/US2011/021182 mailed Jun. 9, 2011, 12 pages.

International Search Report and Written Opinion in PCT/US2011/021172, mailed Apr. 5, 2011, 9 pages.

International Search Report and Written Opinion in PCT/US2010/046707 mailed Dec. 8, 2010, 12 pages.

Spratt, "An Overview of Positioning by Diffusion," *Wireless Networks; The Journal of Mobile Communication, Computation and Information*, 2003(9)(6):565-574.

Koshima and Hoshen, "Personal locator services emerge," IEEE Spectrum, Feb. 2000, pp. 41-48.

International Preliminary Report on Patentability in PCT/US2011/021172 mailed Jul. 26, 2012, 6 pages.

International Preliminary Report on Patentability in PCT/US2010/046707 mailed Jul. 26, 2012, 9 pages.

Non-Final Office Action in U.S. Appl. No. 12/869,385 mailed Aug. 17, 2012, 32 pages.

Restriction Requirement in U.S. Appl. No. 12/869,518 mailed Jul. 25, 2012, 6 pages.

Non-Final Office Action in U.S. Appl. No. 12/869,553 mailed Jul. 13, 2012, 23 pages.

Non-Final Office Action in U.S. Appl. No. 12/869,566, mailed Sep. 28, 2012, 17 pages.

Non-Final Office Action in U.S. Appl. No. 12/959,284, mailed Oct. 24, 2012, 16 pages.

Final Office Action in U.S. Appl. No. 12/869,553, mailed Apr. 15, 2013, 24 pages.

Examination Report in CN201010570595.6, mailed Apr. 1, 2013, 17 pages.

* cited by examiner

LOCATION-BASED APPLICATION PROGRAM MANAGEMENT

CROSS REFERENCE TO RELATED APPLICATIONS

This application is a divisional of and claims priority to U.S. patent application Ser. No. 12/755,802, filed on Apr. 7, 2010, the entire contents of which are hereby incorporated by reference.

TECHNICAL FIELD

This disclosure relates generally to location-based processing on a mobile device.

BACKGROUND

A modern mobile device can incorporate functions of a computer, of a cellular transceiver, or a wireless (e.g., WiFi™) transceiver. For example, the mobile device can perform traditional computer functions, such as executing application programs, storing various data, and displaying digital images. These functions can be performed in an application subsystem of the mobile device. The application subsystem can include an application processor, an application operating system, and various input/output devices.

When the mobile device functions as a cellular transceiver, the mobile device can initiate and receive phone calls, send and receive data over a cellular network, identify cellular tower connections, and determine when and whether to switch cellular towers. Similarly, the mobile device can function as a wireless radio transceiver and send and received data over a wireless network, e.g. a WiFi™ network. These radio-related functions can be performed in a baseband subsystem of the mobile device. The baseband subsystem can include a baseband processor and a baseband operating system. The baseband processor can be an integrated circuit (IC) device (e.g., a Large Scale Integrated Circuit (LSI)) that performs communication functions. The baseband processor can include, for example, a Global System for Mobile Communications (GSM) modem. The baseband processor can be can be integrated with the application processor in a System-on-Chip (SoC). In general, the application subsystem can consume more power than the baseband subsystem when activated.

SUMMARY

Methods, program products, and systems for location-based application program management are disclosed. In general, in one aspect, a mobile device can receive a first application program to be executed in an application subsystem. The first application program can be configured to be invoked when the mobile device is located inside a defined geographic region. The mobile device can register the first application program to a second application program that executes in a baseband subsystem. The mobile device can set the first application program, or the application subsystem, or both, to a power-saving operating mode. The second application program can monitor a current location of the mobile device. When the mobile device is currently located inside the defined geographic region, the second application program can invoke or notify the first application program.

In another aspect, the mobile device can be used to configure the first application program and the second application program through various configuration application programming interfaces (APIs). A method for configuring a geographic region to be associated with the first application is disclosed. The method can include receiving a request for configuring the geographic region, the geographic region to be associated with the first application program, the first application program to be invoked when the mobile device enters the geographic region; and, responsive to the request, configuring the geographic region through an application programming interface, the configuring including specifying one or more first call parameters according to a first calling convention defined by the application programming interface, where at least one of the first call parameters specifies a centroid of the geographic region.

In another aspect, the mobile device can provide various location-monitoring APIs. A method for monitoring a location of the mobile device is disclosed. The method can include receiving a request for invoking the first application program on the mobile device, the request specifying that the first application program is to be invoked when the mobile device has crossed a boundary into a geographic region; responsive to the request, monitoring a location of the mobile device through an application programming interface, the monitoring including: specifying one or more first call parameters according to a first calling convention defined by the application programming interface, where at least one first call parameter specifies the geographic region; and determining whether the mobile device has entered the geographic region; upon determining that the mobile device has entered the geographic region, invoking the application program on the mobile device through the API according to a second calling convention defined by the API, including specifying one or more second call parameters, where at least one second call parameter specifies the geographic region.

The details of one or more implementations of location-based application program management are set forth in the accompanying drawings and the description below. Other features, aspects, and advantages of location-based application program management will become apparent from the description, the drawings, and the claims.

BRIEF DESCRIPTION OF THE DRAWINGS

Like reference symbols in the various drawings indicate like elements.

DETAILED DESCRIPTION

Overview of Location-Based Application Program Management

Figure 1:
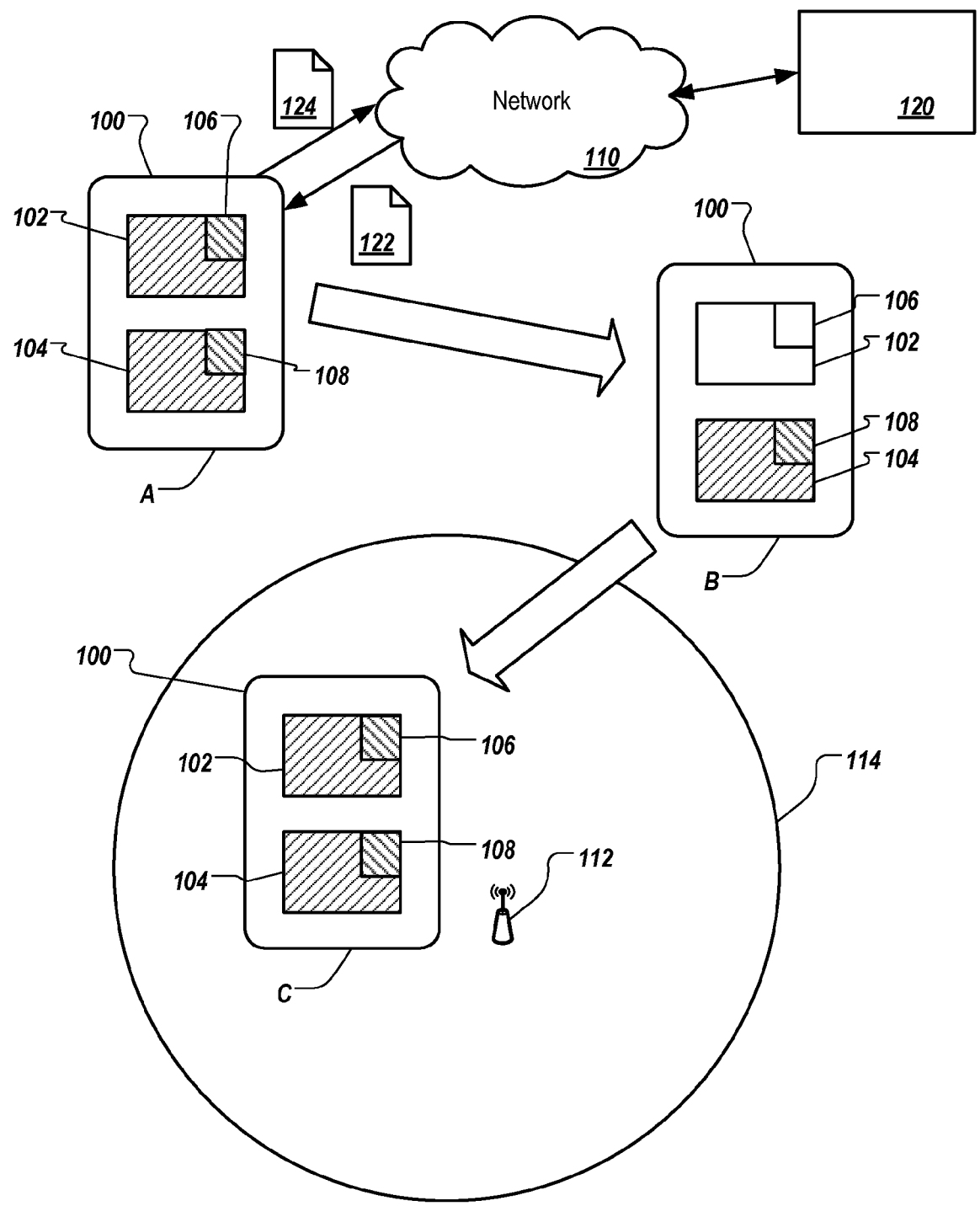
FIG. 1 is an overview of techniques of location-based application program management.

FIG. 1 is an overview of techniques of location-based application program management. Mobile device 100 can be an exemplary mobile device that implements the techniques of location-based application program management. Mobile device 100 can include application subsystem 102 that performs functions traditionally performed on a computer, baseband subsystem 104 that performs communication functions traditionally performed on a cellular telephone, and a wireless communications subsystem that can perform functions of a wireless transceiver.

Box A represents a state (state A) of mobile device 100 when configuring location-based application program 106. In state A, both application subsystem 102 and baseband subsystem 104 can be in an active mode, where application subsystem 102 is processing an application and baseband subsystem 104 is processing communications information. Mobile device 100 can acquire application program 106 that executes in application subsystem 102 by downloading (e.g., from server 120 through communications network 110), by copying from a storage device (e.g., a flash memory card), or by creating application program 106 locally (e.g., by writing source code on mobile device 100 and compiling and linking the source code).

In state A, application program 106 can be configured to be invoked or notified when mobile device 100 is located in a particular geographic region (e.g., geographic region 114). Invoking application program 106 can include loading application program 106 from a storage device to active memory (e.g., random access memory (RAM)) of application subsystem 102 and executing the loaded program. Parameters (e.g., geographic coordinates) can be passed to application program 106 upon invocation. Notifying application program 106 can include locating application program 106 that has already been loaded into memory by identifying a process of application program 106 using a process identifier (PID). The process, before notification, can be in a background mode (e.g., without interacting with user through a user interface). The notification can bring the process to the foreground (e.g., by presenting a user interface). Alternatively, the notification can comprise an interrupt or other event that can cause the execution of an already loaded application program to be altered, even if the program is already in a foreground mode.

Configuring application program 106 to be invoked or notified in a geographic region can include defining the geographic region and defining various ways to detect that mobile device 100 has entered the geographic region. Mobile device 100 enters the geographic region if mobile device 100 at least partially crosses a boundary, or geofence, surrounding the geographic region. Once an entrance is detected, application program 106 can be invoked or notified. Likewise, once a departure from the geographic region, application program 106 can be terminated or set to be executed as a background process.

Configuring application program 106 to be invoked or notified in a geographic region can occur on mobile device 100 or on server 120. In some implementations, a user can define a geographic region on mobile device 100 by drawing boundaries of the geographic region using a finger or a pointing device (e.g., a stylus) on a digital map displayed on a touch-sensitive display screen of mobile device 100. Additionally or alternatively, the user can define a region by defining a center and a radius. The center can be a centroid of the region, defined by tapping a particular point on the digital map, or by designating a current location of mobile device 100, which can be determined by a global positioning system (GPS) receiver coupled to mobile device 100.

The user can specify various ways to detect that mobile device 100 has entered or exited the geographic region. For example, the user can specify that the detection can be achieved using wireless access gateways including cellular towers, access points of wireless local area networks (WLAN), or both. To do so, mobile device 100 can submit coordinates of the geographic region to server 120, and acquire from server 120 information on wireless access gateways associated with the geographic region.

In some implementations, mobile device 100 can submit request 124 to server 120 through network 110. Request 124 can include geographic coordinates of the region. The geographic coordinates can include latitude, longitude, and optionally altitude that can be expressed as a unit of length (e.g., meters or feet) above or below sea level. The latitude, longitude, and altitude can be associated with the center (or centroid) of the geographic region defined. Request 124 can also include a radius.

In some implementations, the geographic region can be represented by a polygon having multiple vertices. Request 124 can include latitudes, longitudes, and optionally altitudes of the vertices of the geographic region that the user drew on the digital map.

In some implementations, request 124 can request information on a "need to know" basis. Request 120 can include information on a coarse current location of mobile device 100 (e.g., a location area code (LAC) that is current to mobile device 100). The information can be used to limit the amount of information transferred from server 120 to mobile device 100. Only information relevant to the coarse current location is sent from server 120 to mobile device 100.

Using request 124 received from mobile device 100, server 120 can identify one or more wireless access gateways (e.g., wireless access gateway 112) that correspond to the geographic region. A wireless access gateway (e.g., wireless access gateway 112) can correspond to a geographic region (e.g., geographic region 114) when it can be determined with sufficient certainty that mobile device 100 is located in the geographic region when mobile device 100 is within a communication range of the access gateway. For example, wireless access gateway 112 can correspond to geographic region 114 when wireless signals sent from mobile device 100 can be received by wireless access gateway 112 with sufficient signal to noise ratio.

In some implementations, server 120 can provide identifiers 122 to mobile device 100 even when request 124 contains no geographic coordinates. Instead of geographic coordinates, request 124 can include an identifier of application program 106. Some application programs 106 can be associated with geographic regions designated by a developer. For example, a surfing information application program can be pre-configured to correspond to various beach areas. Upon receiving a request from mobile device 100, server 120 can identify the pre-configured information on the geographic region, as well as the wireless access gateways, that are associated with application program 106.

Server 120 can send identifiers 122 of the one or more identified wireless access gateways to mobile device 100. Mobile device 100 can register identifiers 122 of the identified wireless access gateways with a second application program, e.g., location monitoring program 108. Location monitoring program 108 can execute in baseband subsystem 104. Registering identifiers 122 with location monitoring program 108 can include storing identifier 122 in association with an identifier of application program 106. The identifier of application program 106 can include, for example, a process identifier, or a path to application program 106, or both.

In some implementations, identifiers 122 can include only identifiers that mobile device 100 "needs to know." The identifiers can be a subset of identifiers of all wireless access gateways associated with a geographic region (e.g., geographic region 114). Geographic region 114 can be sufficiently large that multiple wireless access gateways are encompassed. For example, geographic region 114 can be a city or a state that includes multiple location areas of a cellular network, each location area being represented by a location area code (LAC) and including multiple cell towers. Identifiers 122 can include cell identifiers (cell IDs) that are located within a current location area of mobile device 100. When mobile device 100 moves to another location area, mobile device 100 can send a new request to server 120. The new request can include a new LAC. In response to the request, server 120 can send to mobile device 100 identifiers 122 of wireless access gateways (e.g., cell IDs) located in the new location area.

Box B represents a state (state B) of mobile device 100 after a period of idling. In state B, application subsystem 102 can be in a power saving mode. Generally, application subsystem 102 can consume more power than baseband subsystem 104 when operating in active mode. To conserve battery power of mobile device 100, application subsystem 102 can be set to a power saving mode (e.g., standby mode or sleep mode) after a period of idling (e.g., one minute). In the power saving mode, non essential components of application subsystem 102 can be temporarily suspended. For example, an image of volatile memory, if any, can be cached on non volatile storage device, and power supply to the volatile memory can be switched off. Non essential parts of the core of the application processor can be turned off. The clock of the processor can be slowed down.

In state B, baseband subsystem 104 can continue to operate in active mode while application subsystem 102 is operating in the power-saving mode. Location monitoring program 108 can continue to execute in baseband subsystem 104 as a daemon (e.g., as a background process without requiring input from application program 106 or from a user). Location monitoring program 108 can monitor a current location of mobile device 100 continuously or intermittently. For example, location monitoring program 108 can monitor current wireless access gateways that are within communication range of mobile device location of mobile device 100. Location monitoring program 108 can compare identifiers of these gateways with identifiers of wireless access gateways that are registered by application program 106.

Box C represents a state (state C) of mobile device 100 when mobile device 100 moves within communication range of wireless access gateway 112. Location monitoring program 108 can detect an identifier of wireless access gateway 112 that identifies a cell tower (e.g., a cell ID). Location monitoring program 108 can determine that the detected identifier matches an identifier associated with application program 106. In some implementations, a location monitoring program can detect a media access control (MAC) address that identifies an access point to a wireless local area network. A set of one or more MAC addresses can be associated with application program 106. The location monitoring program can determine that a sufficient number of detected MAC addresses match some or all MAC addresses in the set. For example, the location monitoring program can determine that at least a threshold number (e.g., three) or a threshold percentage (e.g., 50%) of the MAC addresses in the set are located within communication range of mobile device 100. The location monitoring program that can detect the MAC addresses can be implemented in application subsystem 102, baseband subsystem 104, or a wireless communications subsystem.

In state C, location monitoring program 108 can "wake," or activate, application subsystem 102 by setting application subsystem 102 to active mode (if application subsystem 102 in currently in power-saving mode). Location monitoring program 108 can signal to application subsystem 102 that application program 106 is to be invoked or notified.

In some implementations, the signal can include be accompanied by the identifier of the wireless access gateway found to be a match. Application subsystem 102 can be responsible for identifying which application program to invoke or notify based on the identifier. In some implementations, the signal can include or be accompanied by parameters of geographic region 114 (e.g., the center of geographic region 114 and a current distance between mobile device 100 and the center). The parameters can be passed to application program 106. In some implementations, the signal can include or be accompanied by an identifier of the application program to invoke or notify (e.g., a file path or process identifier).

If mobile device 100 moves outside a geographic region where wireless gateways are registered, location monitoring program 108 can communicate with application subsystem 102, and request re-registration of wireless access gateways in a new geographic region. For example, when mobile device 100 moves to a new location area, baseband subsystem 104 can detect a new LAC. Location monitoring program 108 can activate application subsystem 102 and provide to application subsystem 102 the new LAC. Application subsystem 102 can request from server 120 one or more cell IDs in the new LAC to be registered with baseband subsystem 104.

Application program 106 can be associated with multiple and discrete geographic regions 114 and wireless access gateways 112. For example, a surfing information application can be associated with Montara Beach of California, Sunset Beach of Hawaii, and Cape Hatteras area of North Carolina. Likewise, multiple application programs 106 can be associated with a single geographic region 114 and a single wireless access gateway 112. In some implementations, each application program 106 can register with its own location monitoring program 108 and can have a separate daemon.

Figure 2:
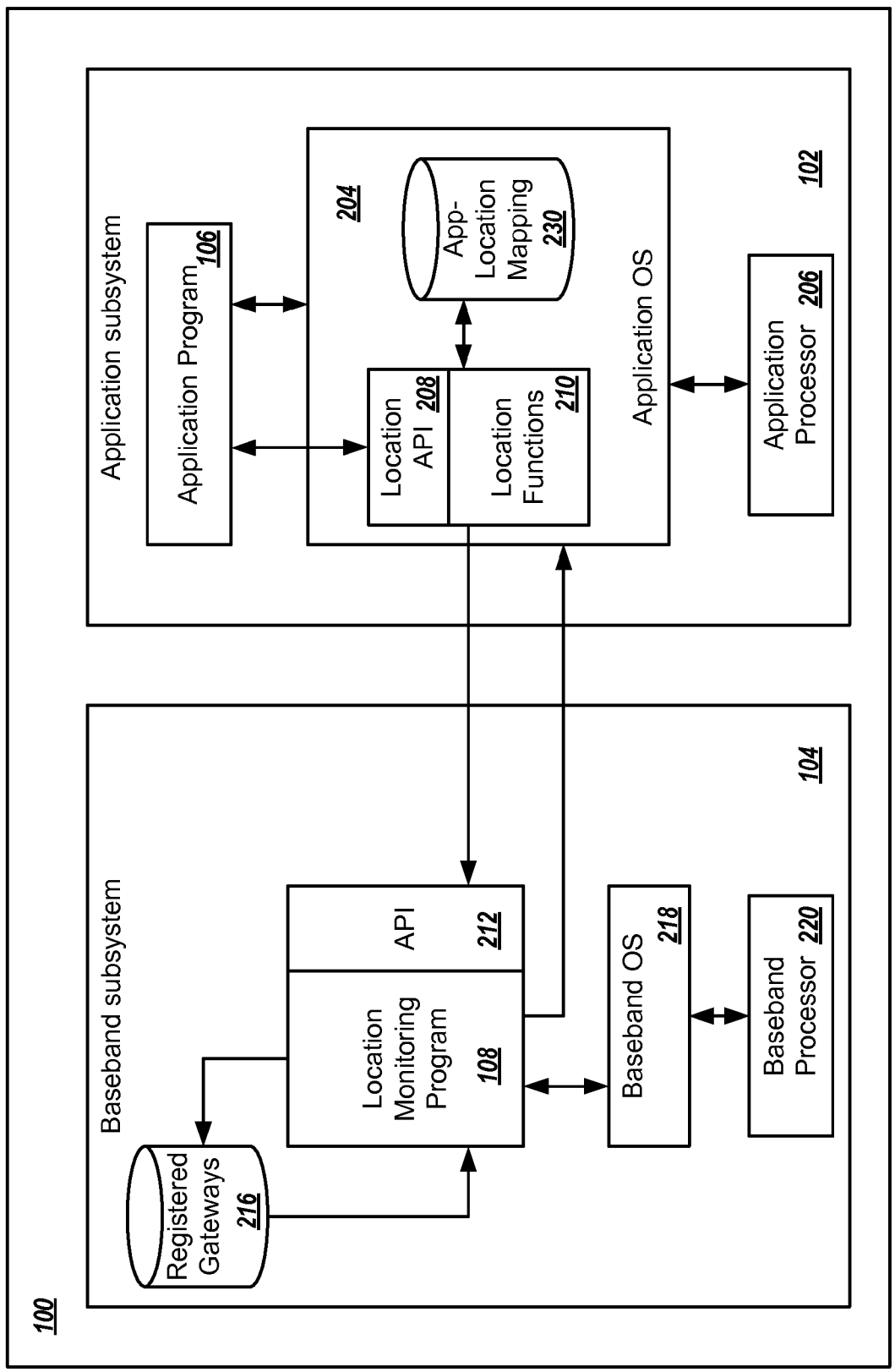
FIG. 2 is a block diagram illustrating exemplary components implementing location-based application program management techniques.

FIG. 2 is a block diagram illustrating exemplary components implementing location-based application program management techniques. Mobile device 100 can include, among other components, application subsystem 102 and baseband subsystem 104. Application subsystem 102 can include application operating system 204, and application processor 206. One or more application programs 106 can execute in application subsystem 102. Application operating system 204 can include various location functions 210. Location functions 210 can include, for example, functions that can retrieve current geographic location from a GPS receiver, and functions for communicating with baseband subsystem 104. Location functions 210 can be exposed to application programs 106 through location API 208. Location API 208 can have a public interface that allows development of "crowdware." Crowdware can include user generated software (e.g., application programs or widgets) that can be invoked when mobile device 100 is located in a particular geographic region (e.g., geographic region 114).

Location functions 210 can communicate with location monitoring program 108 of baseband subsystem 104. In some implementations, location monitoring program 108 can be exposed to location functions 210 through API 212. Baseband subsystem 104 can include baseband operating system 218 and baseband processor 220.

Location functions 210 can register one or more identifiers 122 of wireless access gateways with location monitoring program 108. Identifiers 122 of wireless access gateways can be stored in registered gateways data store 216. Location monitoring program 108 can monitor a current wireless access gateway (e.g., by cell ID), and match information on the current wireless access gateway with identifiers of wireless access gateways in data store 216. If a match is found, location monitoring program 108 can pass the matched identifier to application operating system 204 of the application subsystem 102.

Upon receiving the identifier of the wireless access gateway, application operating system 204 can determine which application program 106 to invoke or notify. The determination can be make using application-location mapping data store 230. Application-location mapping data store 230 can include mappings between application programs 106 and corresponding identifiers wireless access gateways. For example, application-location mapping data store 230 can store a file path or a PID of a surfing information program, and identifiers of wireless access gateways of the various beaches associated with the surfing information program. Application-location mapping data store 230 can be populated when mobile device 100 receives identifiers 122 and registers the identifiers 122. Application-location mapping data store 230 can be updated when a process of application program 106 changes states. Application program 106 can execute in a foreground state or a background state, and can be inactive (e.g., not running at all). When application program 106 changes from a background state to an inactive state, application-location mapping data store 230 can be updated to change a PID of application program 106 to a file path of application program 106. Application-location mapping data store 230 can reside on mobile device 100 or on a server connected to mobile device 100 through a communications network, or be distributed on multiple mobile devices and servers.

Figure 3:
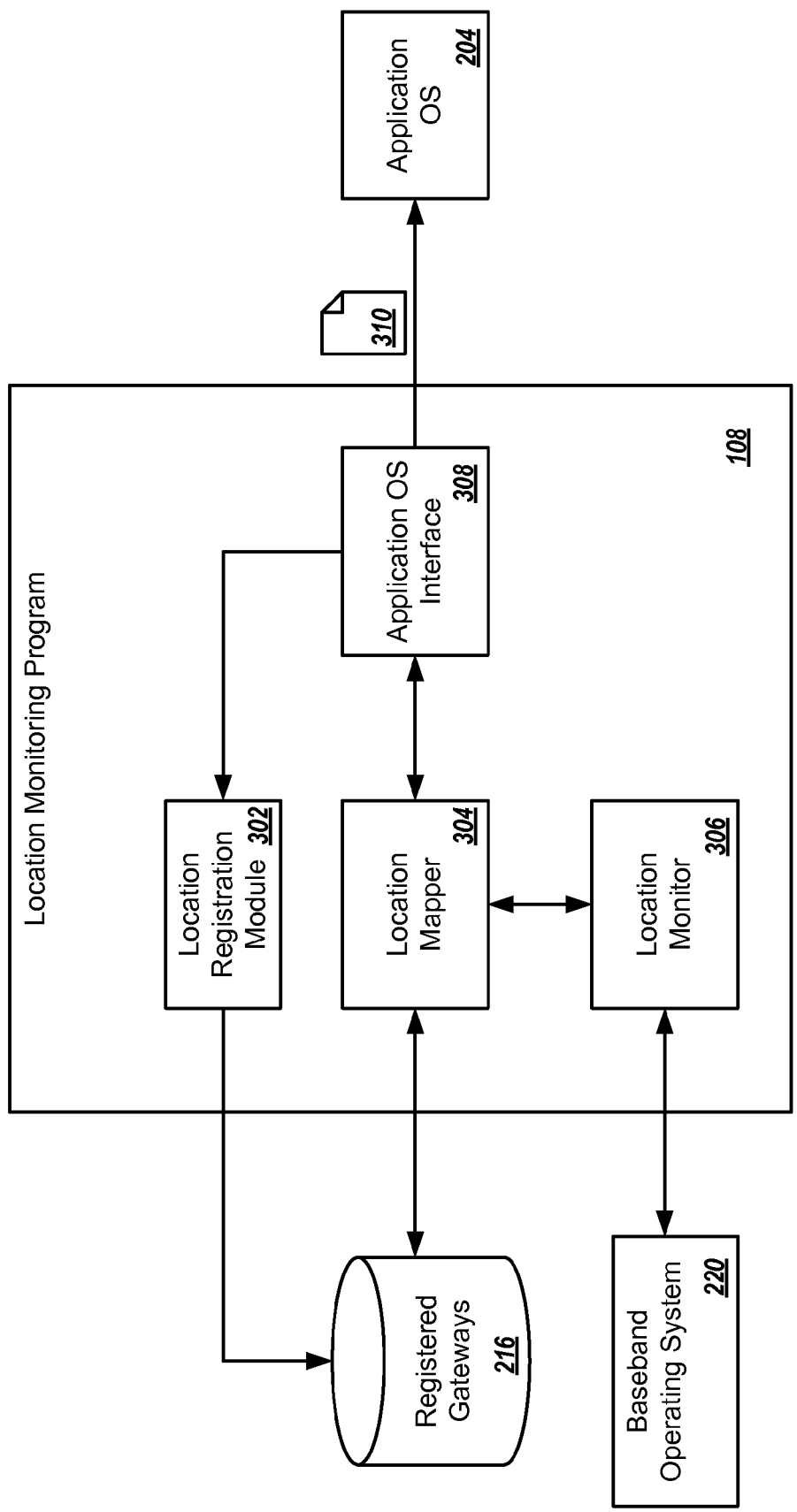
FIG. 3 is a block diagram illustrating components of an exemplary location monitoring program used in location-based application program management.

FIG. 3 is a block diagram illustrating components of exemplary location monitoring program 108 used in location-based application program management. Location monitoring program 108 can include application operating system interface 308 that performs functions that either directly or indirectly (e.g., through API 212) interact with application operating system 204.

Location monitoring program 108 can include location registration module 302. Location registration module 302 can receive one or more identifiers of wireless access gateways associated with an application program, and store the identifiers of wireless access gateways in registered gateways data store 216. Registered gateways data store 216 can reside in system memory of baseband subsystem 104.

Location monitoring program 108 can include location monitor 306. Location monitor 306 can communicate with baseband operating system 218 and request and receive location information from baseband operating system 218. In various implementations, the location information can include current cell ID, current LAC, current mobile country code (MCC), and other identifiers of access gateways of various wireless communications networks. The identifiers can be passed to location mapper 304, which can compare the identifiers with identifiers stored in registered gateways data store 216. If a match is found, location mapper 304 can communicate with application operating system 204 through application operating system interface 308. The communication can include various parameters 310 that can include information for identifying an application program to be invoked (e.g., the identifier of the matched access gateway).

Figure 4A:
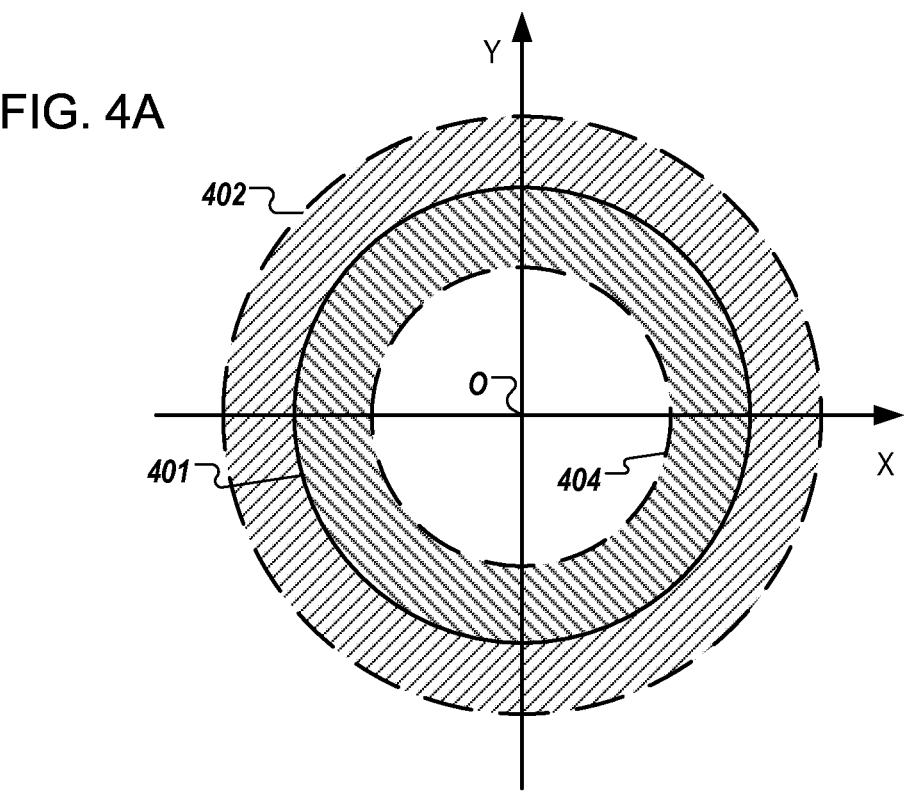
FIGS. 4A and 4B illustrate exemplary regions in which application programs are invoked or terminated.
Figure 4B:
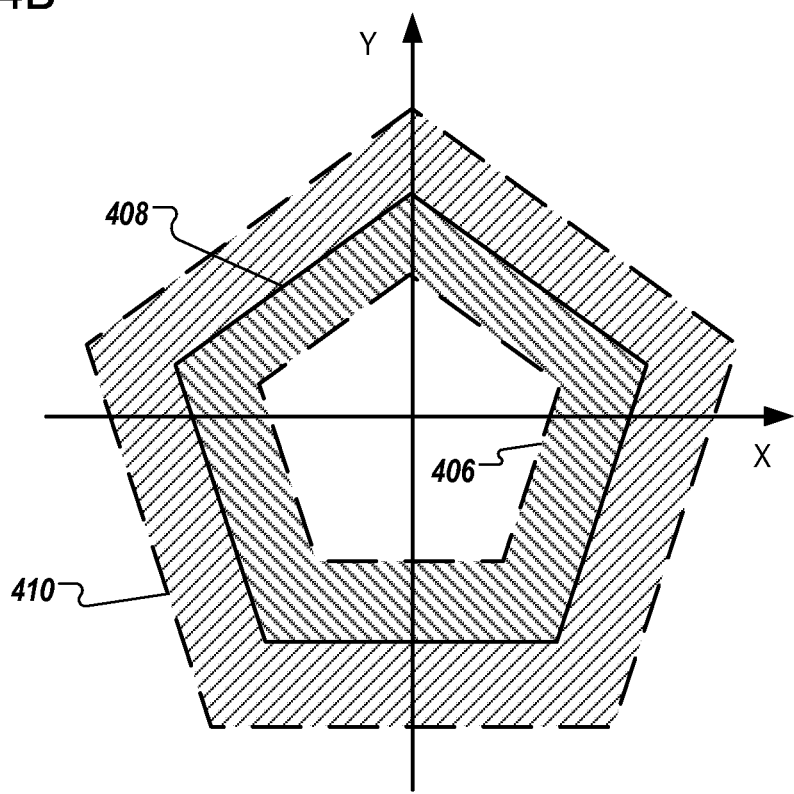

FIGS. 4A and 4B illustrate exemplary regions in which application programs are invoked or terminated. FIG. 4A illustrates some implementations where the region is circular.

An application program (e.g., application program 106) for a mobile device can be associated with circular region 401 having a center O and a radius. Circular region 401 can be geographic region 114 as described above in reference to FIG. 1. The center O can be defined using coordinates including latitude and longitude. The radius can be defined in various length units (meters, kilometers, miles, nautical miles, etc.) Application program 106 can be configured such that mobile device 100 can invoke or notify application program 106 when mobile device 100 is located within circular region 401. Application program 106 can be further configured such that mobile device 100 can terminate or notify application program 106 when mobile device 100 moves out of circular region 401.

Circular region 401 can be associated with tolerances. The tolerances can include an entrance tolerance and an exit tolerance. An entrance tolerance can refer to a first distance, such that mobile device 100 can invoke or notify application program 106 when mobile device 100 is at least that distance deep in the circular region, for example, when mobile device 100 is inside circular region 401 and is at least the distance away from circumference of circular region 401. Shaded area between circular region 401 and circular region 404 represents an area within the entrance tolerance.

An exit tolerance can refer to a second distance, such that mobile device 100 can notify or terminate application program 106 when mobile device 100 is at least that distance away from circular region 401, for example, when mobile device 100 is outside of circular region 401 and is at least the distance away from circumference of circular region 401. Shaded area between circular region 401 and circular region 402 represents an area within the exit tolerance. The entrance tolerance and the exit tolerance can be either identical or distinct from each other. In some implementations, the entrance tolerance and exit tolerance can be used to describe an ambiguous zone, in which behavior of application program 106 can be determined by how deeply mobile device 100 is located inside circular region 401 or how far away mobile device 100 is located outside circular region 401. For example, an entrance tolerance can include a function that measures a depth of penetration, or penetration distance, into circular region 401. When mobile device 100 invokes or notifies application program 106 at a penetration distance into circular region 401, the penetration distance (or a value derived from the penetration distance) can be passed to application program 106 as a parameter. Application program 106 can use the parameter, for example, to determine what content to provide to the user (e.g., the deeper the penetration, the more specific the content on a topic).

FIG. 4B illustrates some implementations where the region has a random shape 408. In addition to being a circular region, the region associated with an application program can have any shape (e.g., an ellipse, a convex or concave polygon, or a free-style geometric shape). Random shape 408 can be defined by, for example, multiple focal points (or a long axis and a short axis) of an ellipse, or a sequence of vertices, each vertex being defined by geographic coordinates. Entrance and exit tolerances can be associated with random shape 408, as represented by the shaded area between random shape 406 and random shape 408, and the shaded area between random shape 408 and random shape 410, respectively. Random shape 410 can have a center that is a centroid, a mean center, a center of a minimum bounding rectangle (MBR) of random shape 410, a center of a smallest circle that completely encloses random shape 410, a center of a largest inscribed circle of random shape 410, or a center defined using any geometric or statistic (e.g., Monte Carlo) method.

Exemplary User Interfaces of Location Determination Using Cached LAC

Figure 5:
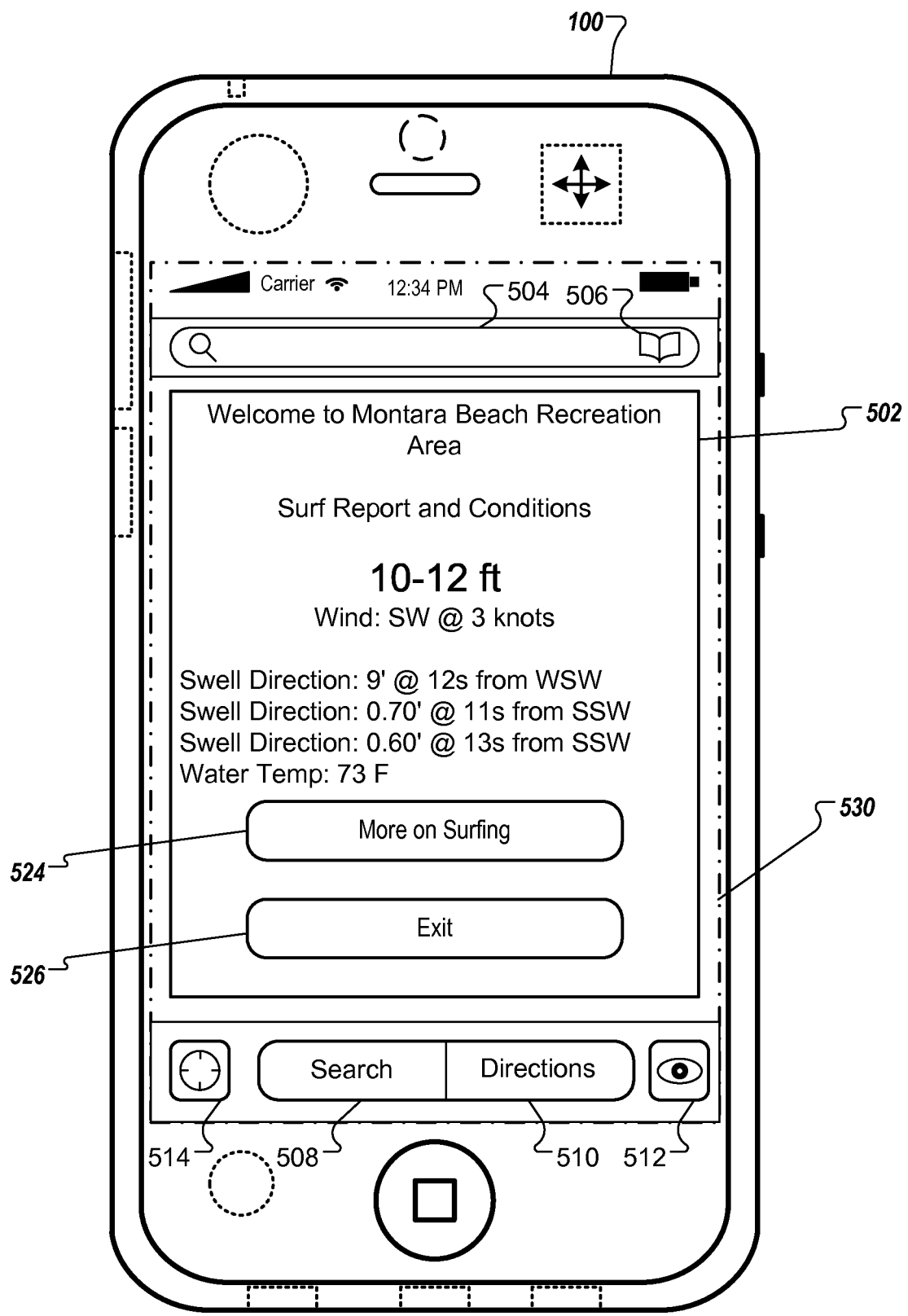
FIG. 5 illustrates an exemplary user interface of a crowd-ware application program activated using location-based application program management techniques.

FIG. 5 illustrates an exemplary user interface of a crowdware application program activated using location-based application program management techniques. A user can create an application program that displays surf report and conditions on mobile device 100. The application program can be invoked by mobile device 100 when mobile device 100 is located at or near various surfing venues. The user can associate the application program with the various surfing venues by specifying the surfing venues on a map input device. Upon invocation, the application program can acquire a location of mobile device 100 using GPS functions. The location acquired using the GPS functions can be a location that has a maximum precision. The application program can use the location as search parameters to retrieve the surf report and conditions from various sources (e.g., web sites). As an example, in FIG. 5, the application program is a surf information program that can display exemplary surf report 502.

In FIG. 5, exemplary surf report 502 of Montara Beach Recreation area in Northern California is displayed on display device 530 of mobile device 100. Mobile device 100 can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices. Display device 530 can include a multi-touch sensitive screen that can receive user inputs.

Exemplary surf report 502 can be displayed on mobile device 100 when mobile device 100 is located at or near Montara Beach. Mobile device 100 can invoke or notify the crowdware application program that displays exemplary surf report 502 when, for example, mobile device 100 detects that mobile device 100 is located within communication range of a cellular tower associated with a geographic region that corresponds to Montara beach. When the user specifies the surf venue, a server (e.g., server 120) can identify the cell ID of the cellular tower from a database. Surf report 502 can include user input button 524 that allows a user to request more surfing information and user input button 526 that allows a user to quit the surfing information application program.

A search bar 504 and a bookmarks list object 506 can be displayed at the top of surf report 502. Below the bottom of surf report 502 one or more display objects can be displayed, for example a search object 508, a directions object 510, a map view object 512, and a current location object 514.

The search bar 504 can be used to find an address or other location on the map. For example, a user can enter her home address in the search bar 504. The bookmarks list object 506 can, for example, display a Bookmarks list that contains addresses that are frequently visited, such as the user's home address. The Bookmarks list can also, for example, contain special bookmarks such as bookmarked locations of mobile device 100.

Search object 508 can be used to display search bar 504 and other map related search menus. Directions object 510 can, for example, display a menu interface that allows the user to enter a start and end location. The interface can then display information (e.g., directions and travel time for a route from the start location to the end location). Map view object 512 can display a menu that can allow the user to select display options for the crowdware application program. Current location object 514 can allow the user to see a geographic region on a map indicating where device 100 is currently located.

Exemplary Location-Based Application Program Management Processes

Figure 6A:
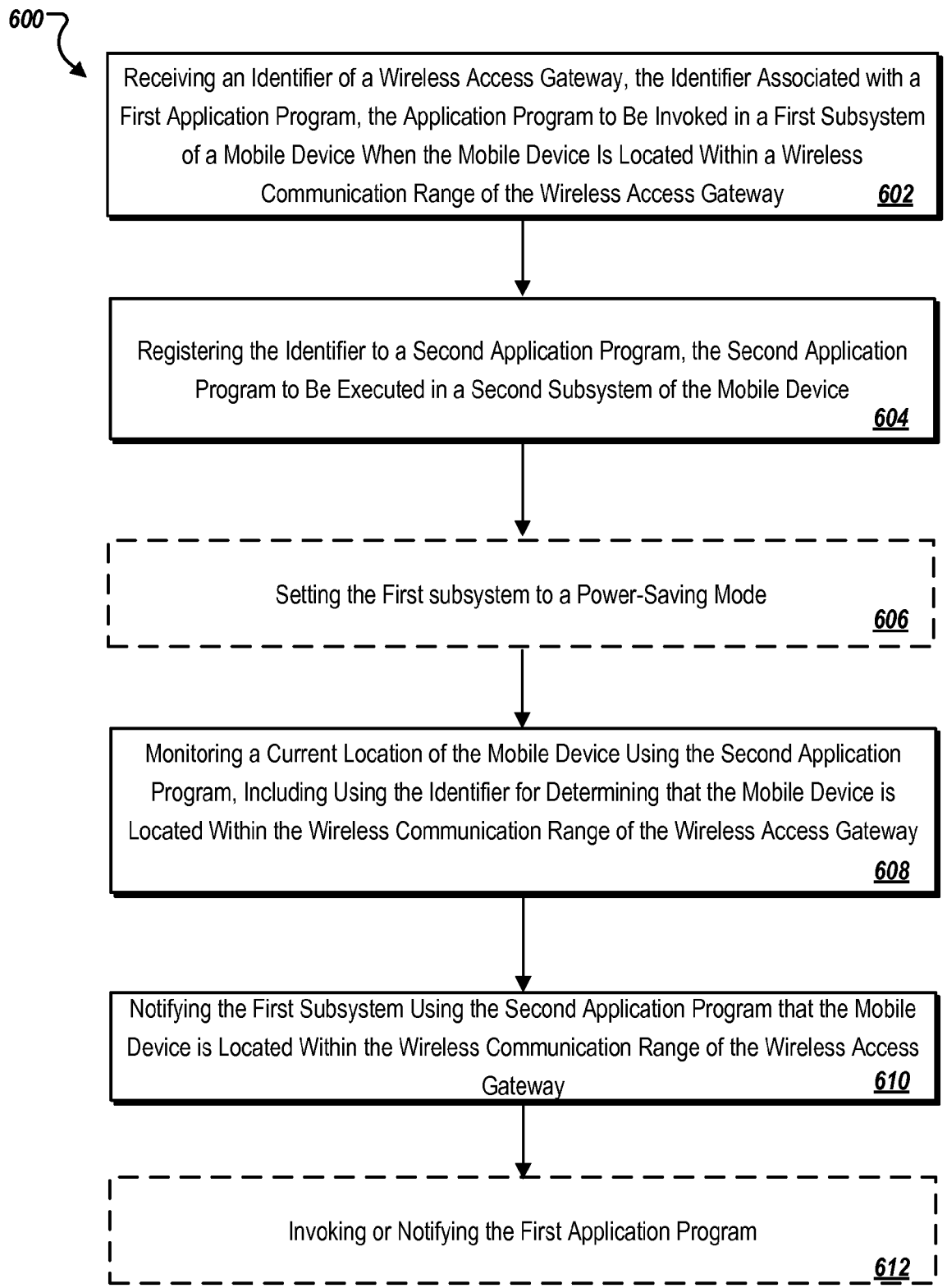
FIGS. 6A and 6B are flowcharts illustrating processes of exemplary implementations of location-based application program management techniques.
Figure 6B:
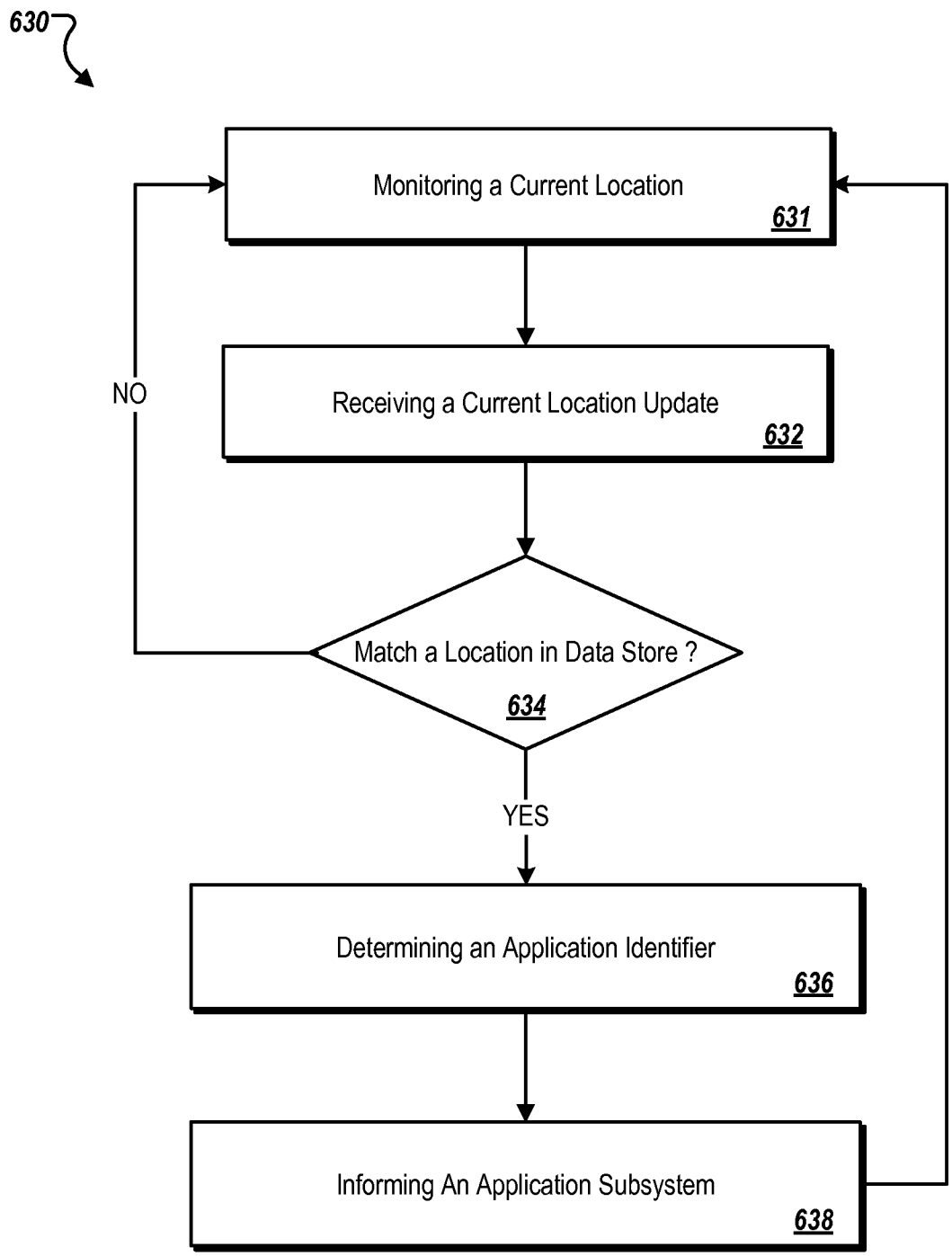

FIGS. 6A and 6B are flowcharts illustrating processes of exemplary implementations of location-based application program management techniques. FIG. 6A illustrates exemplary process 600 of location-based application program management. For convenience, process 600 will be described in reference to mobile device 100 that implements process 600.

Mobile device 100 can receive (602) an identifier of a wireless access gateway, the identifier associated with a first application program, the first application program to be invoked in a first subsystem of mobile device 100 when mobile device 100 is located within a wireless communication range of the wireless access gateway. The first application program can be a crowdware program. The first subsystem can be an application subsystem (e.g., application subsystem 102). The first subsystem can include application processor 206. In various implementations, the wireless access gateway can be a wireless access point of a wireless local area network (WLAN) or a cellular tower. The identifier can be a MAC address, a cell ID, or other unique identifier that can identify the wireless access gateway.

Receiving the identifier of the wireless access gateway can optionally include receiving coordinates of a geographic region from a map input device of mobile device 100. The map input device can include, for example, the multi-touch sensitive screen of display device 530. Mobile device 100 can request to a server (e.g., server 120) the identifier of the wireless access gateway. The request can be made when the user has defined the geographic region, or when mobile device 100 moves from one geographic area to another, triggering an update (e.g., when mobile device 100 moves from one location area of a cellular network to another location area of the cellular network). Mobile device 100 can receive the identifier of wireless access gateway from the server, the wireless access gateway having a location corresponding to the geographic region.

Mobile device 100 can register (604) the identifier to a second application program to be executed in a second subsystem of mobile device 100. The second application program can include location monitoring program 108. The second subsystem can be baseband subsystem 104. The baseband subsystem 104 can include baseband processor 220. The baseband subsystem 104 can consume less power than application subsystem 102 when application subsystem 102 is set to a first execution mode (e.g., an active execution mode). For example, application subsystem 102 can consume power at a first power consumption level when application subsystem 102 is set to an active execution mode. Baseband subsystem 104 can consume power at a second power consumption level when operating. The second power consumption level can be lower than the first power consumption level.

In some implementations, the second subsystem can include a wireless communications subsystem that can detect one or more MAC addresses of wireless access points that are located within a communication range of mobile device 100. The wireless communications subsystem can include a wireless communications operating system and a wireless communications processor. The wireless communications operating system, as well as a location monitoring program, can be stored as firmware on mobile device 100. The location monitoring program can detect changes of wireless access points that are located within a communication range of mobile device 100.

Optionally, mobile device 100 can set (606) application subsystem 102 to a second execution mode (e.g., a power-saving mode), after registering the identifier with the second application program. The first subsystem (e.g., application subsystem 102) can consume power at a third power consumption level when the first subsystem is set to the power-saving mode, the third power consumption level lower than the first power consumption level.

Mobile device 100 can monitor (608) a current location of mobile device 100 using the second application program. The monitoring can include determining that mobile device 100 is located within the wireless communication range of the wireless access gateway.

Mobile device 100 can notify (610) the first subsystem of mobile device 100 that mobile device 100 is located within the wireless communication range of the wireless access gateway. Notifying the first subsystem can include setting the first subsystem to an active operating mode, if the first subsystem is on a power-saving operating mode at time of the notification.

Mobile device 100 can invoke or notify (612) the first application program using the second application program upon determining that mobile device 100 is located within the wireless communication range of the wireless access gateway. Invoking the first application program can include. Notifying the first application program can include bringing a process of first application program from background to foreground. Optionally, mobile device 100 can display a user interface (e.g., surf report 502) of the first application program on a display device (e.g., display device 530) of mobile device 100, once the first application program is invoked or notified.

FIG. 6B is a flowchart illustrating exemplary process 630 of monitoring a current location of a mobile device. For convenience, process 630 will be described in reference to location monitoring program 108 that implements process 630 on mobile device 100.

Location monitoring program 108 can execute in baseband subsystem 104 of mobile device 100. Location monitoring program 108 can monitor (631) a current location of mobile device 100. Location monitoring program 108 can receive (632) a current location update from baseband operating system 218. The current location update can include an identifier (e.g., a cell ID) of a wireless access gateway (e.g., a cellular tower), where mobile device 100 is located within a communication range of the wireless access gateway. The current location update can be initiated by baseband operating system 218.

Location monitoring program 108 can match (634) the identifier received from the current location update with an identifier in registered gateways data store 216. If a match is not found, location monitoring program 108 can continue monitoring the current location of mobile device 100.

If a match is found, location monitoring program 108 can determine (636) an application identifier. The application identifier can include any information that can specify which application program is to be invoked. The information can include a process identifier, a file path, or the identifier of the wireless access gateway (which can be used by application operating system 204 to determine which application program 106 is associated with this particular wireless access gateway).

Location monitoring program 108 can inform (638) an application subsystem upon identifying the match. Informing the application subsystem (e.g., application subsystem 102) can include setting the application subsystem to an active operating mode, and invoking the application program that is associated with the identifier of the wireless access gateway.

Exemplary Location-Based Application Program Management API

Figure 7:
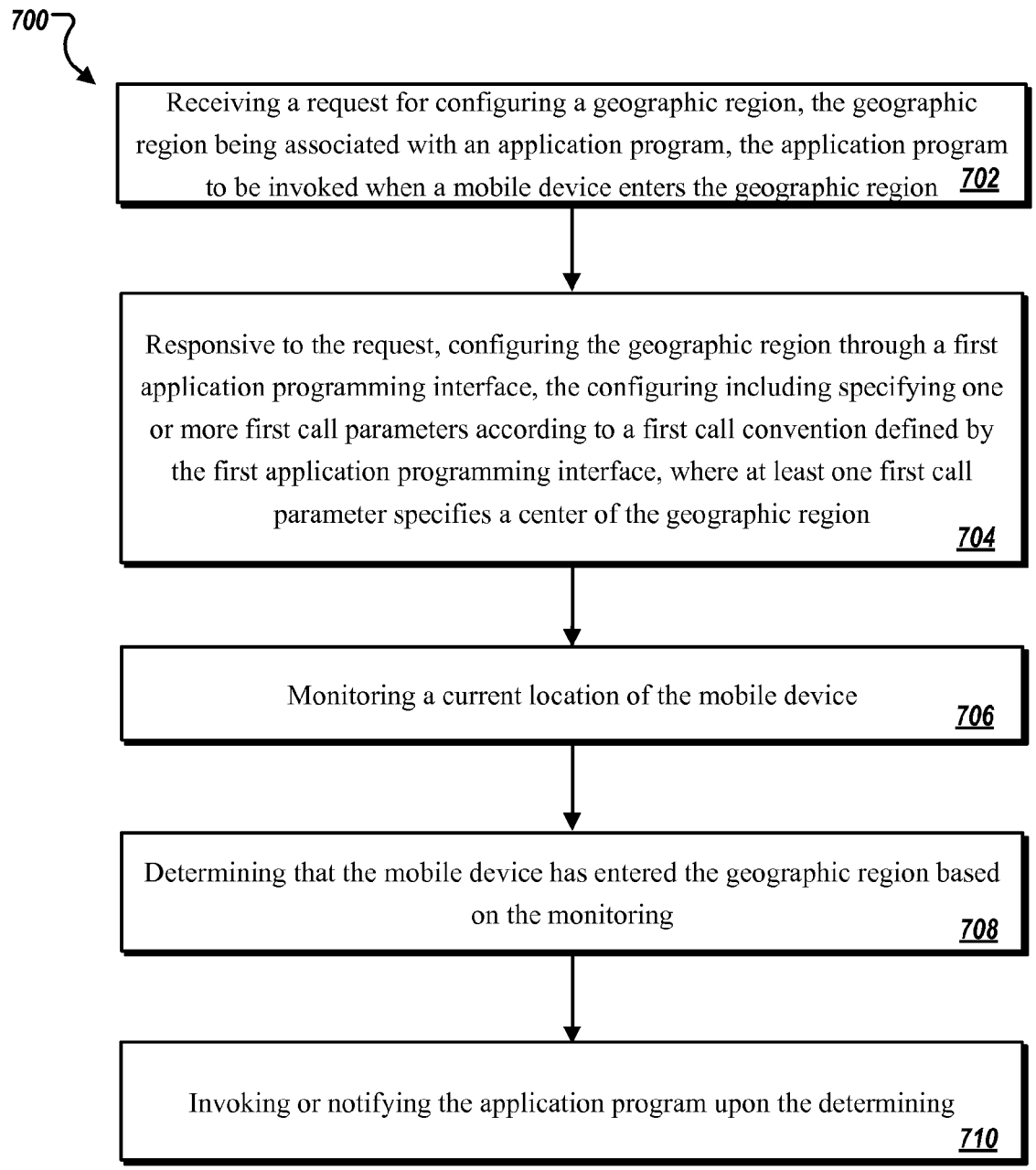
FIG. 7 is a flowchart illustrating an exemplary process for configuring a geographic region to be used for location-based application program management through an exemplary configuration application programming interface (API).

FIG. 7 is a flowchart illustrating exemplary process 700 for configuring a geographic region to be used for location-based application program management through an exemplary configuration (API). For convenience, exemplary process 700 will be described in reference to mobile device 100 that implements process 700. Furthermore, pseudo code will be provided for illustrative purposes.

Mobile device 100 can receive (702) a request for configuring a geographic region. The geographic region can be associated with an application program (e.g., application program 106). The application program can be invoked when mobile device 100 enters the geographic region. The region can be defined on a digital map. The geographic region can be represented by an object having a Region class. In some implementations, the Region class can be used to describe arbitrary shapes. In particular, the Region class can be used to define a circle that has a center and a radius.

Mobile device 100 can configure (704) the geographic region through an API, the configuring including specifying one or more first call parameters according to a first calling convention defined by the API, where at least one first call parameter specifies a center of the geographic region. Configuration can occur responsive to the request. Pseudo code for an interface for initializing an exemplary Region object that represents a circular geographic region is listed below in listing (1).

RegionID initCircularRegionWithCenter((1)
    Coordinates center;
    Distance radius;
    String identifier);

When initialized in an application program (e.g., application program 106), an object of the Region class (a Region object) can be given a unique region identifier (RegionID). The RegionID can be passed to the application program when mobile device 100 crosses a boundary of the geographic region defined in the Region object. The application program can use the RegionID to remove the Region object.

The parameter "center" of listing (1) can include coordinates of a central location of the geographic region. The parameter "radius" can be a distance from the central location where a geographic fence (e.g., a boundary) can be placed. In some implementations, if mobile device 100 moves from with the region to more that "radius" from the "center," the application program can generate a notification by using a LocationManager object.

The "identifier" parameter can include a description for the geographic region that can be displayed to a user (e.g., in a "preferences" user interface or in an alert message. In some implementations, the "identifier" parameter of listing (1) can be chosen by a user of the API. If "nil" is passed for the "identifier" parameter, mobile device 100 can reverse-geocode the Region object (e.g., naming the Region object by using the coordinates in the "center" parameter as the identifier). Mobile device 100 can assign a prefix or a suffix to the reverse-geocoded identifier to generate a unique and user-readable identifier.

The type Coordinates of listing (1) can include a type for two-dimensional coordinates (Coordinates2D) and a type for three-dimensional coordinates (Coordinates3D). The type for two-dimensional coordinates can be defined as including a latitude and a longitude. The type for three-dimensional coordinates can include a latitude, a longitude, and an altitude. The type Distance can be a double type.

In some implementations, configuring the geographic region further includes determining a monitoring threshold, including specifying at least one second call parameters according to a second calling convention defined by the API, where at least one second call parameter specifies a communication range of the mobile device. Pseudo code for an interface for making the determination is listed below in listing (2).

Distance maximumRegionMonitoringRadius((2)
DEVICE_VERSION,
BASEBAND_OS_VERSION);

The "DEVICE_VERSION" parameter can identify a version of hardware of mobile device 100. The "BASEBAND_OS_VERSION" parameter can identify a version of baseband operating system 218 of mobile device 100. Together, the "DEVICE_VERSION" parameter and the "BASEBAND_OS_VERSION" parameter can determine a monitoring range of mobile device 100. In some implementations, if an attempt to register a geographic region larger than the communication range, an error message can be provided.

Mobile device 100 can monitor (706) a current location of mobile device 100. To monitor the current location, mobile device 100 can determine whether region monitoring is available on mobile device 100. Pseudo code for an interface for making the determination is listed below in listing (3).

BOOL regionMonitoringAvailable((3)
DEVICE_VERSION,
BASEBAND_OS_VERSION);

The "DEVICE_VERSION" parameter can identify a version of hardware of mobile device 100. The "BASEBAND_OS_VERSION" parameter can identify a version of baseband operating system 218 of mobile device 100.

To monitor the current location, mobile device 100 can further determine whether region monitoring is enabled on mobile device 100. Pseudo code for an interface for making the determination is listed below in listing (4).

BOOL regionMonitoringEnabled((4)
DEVICE_VERSION,
BASEBAND_OS_VERSION);

Mobile device 100 can check whether region monitoring is enabled before calling other region monitoring APIs. If a function of listing (4) returns "NO" and other region monitoring APIs are called, mobile device can prompt a user using a confirmation panel asking whether region monitoring service is to be enabled.

Pseudo code of an interface for starting and stopping monitoring are provided below in listings (5) and (6), respectively.

(void) startMonitoring (Region region); (5)
(void) stopMonitoring (Region region); (6)

A tolerance can be set for monitoring. The tolerance can represent a distance past a border of the geographic region. If mobile device 100 reaches the distance, application program 106 can be notified that the region border has been crossed (e.g., mobile device 100 has entered or left the geographic region). The tolerance can be useful to prevent repeated notifications when mobile device 100 is located on or near the border of the geographic region. Pseudo code for an interface for making the determination is listed below in listing (7).

(void) desiredAccuracy (LocationAccuracy tolerance); (7)

For example, if the tolerance is set to 100 meters, application program 106 can be invoked (or notified, if application program 106 is already being executed) when mobile device 100 moves 100 meters inside the geographic region. The tolerance value can be honored on a best-effort basis, and can be overwritten if:

(A) The tolerance value is large compared to a size of the region. In such cases, mobile device 100 can overwrite the tolerance value to ensure that notifications or invocations can be generated when mobile device 100 enters the region; or (B) Mobile device 100 fails to provide a precision with respect to the location of mobile device 100 (e.g., due to poor quality of signal, etc.).

Mobile device 100 can determine (708) that mobile device 100 has entered or exited the geographic region based on the monitoring. Determining that mobile device 100 has entered the geographic region can include determining that a current distance between mobile device 100 and the center is smaller than the radius. Pseudo code of an interface for determining whether a location is inside a region is listed below in listing (8).

BOOL containsCoordinate (Coordinates coordinates); (8)

In listing (8), the "coordinates" parameter represents the geographic coordinates of the location. The containsCoordinate function can be a method associated with a Region class. The function can be used, for example, for verifying that mobile device 100 is located in a particular geographic region when application operating system 204 receives a notification or an invocation request from baseband subsystem 104. The coordinates parameter can be coordinates of a current location of mobile device 100, acquired through a GPS component of mobile device 100.

Figure 8:
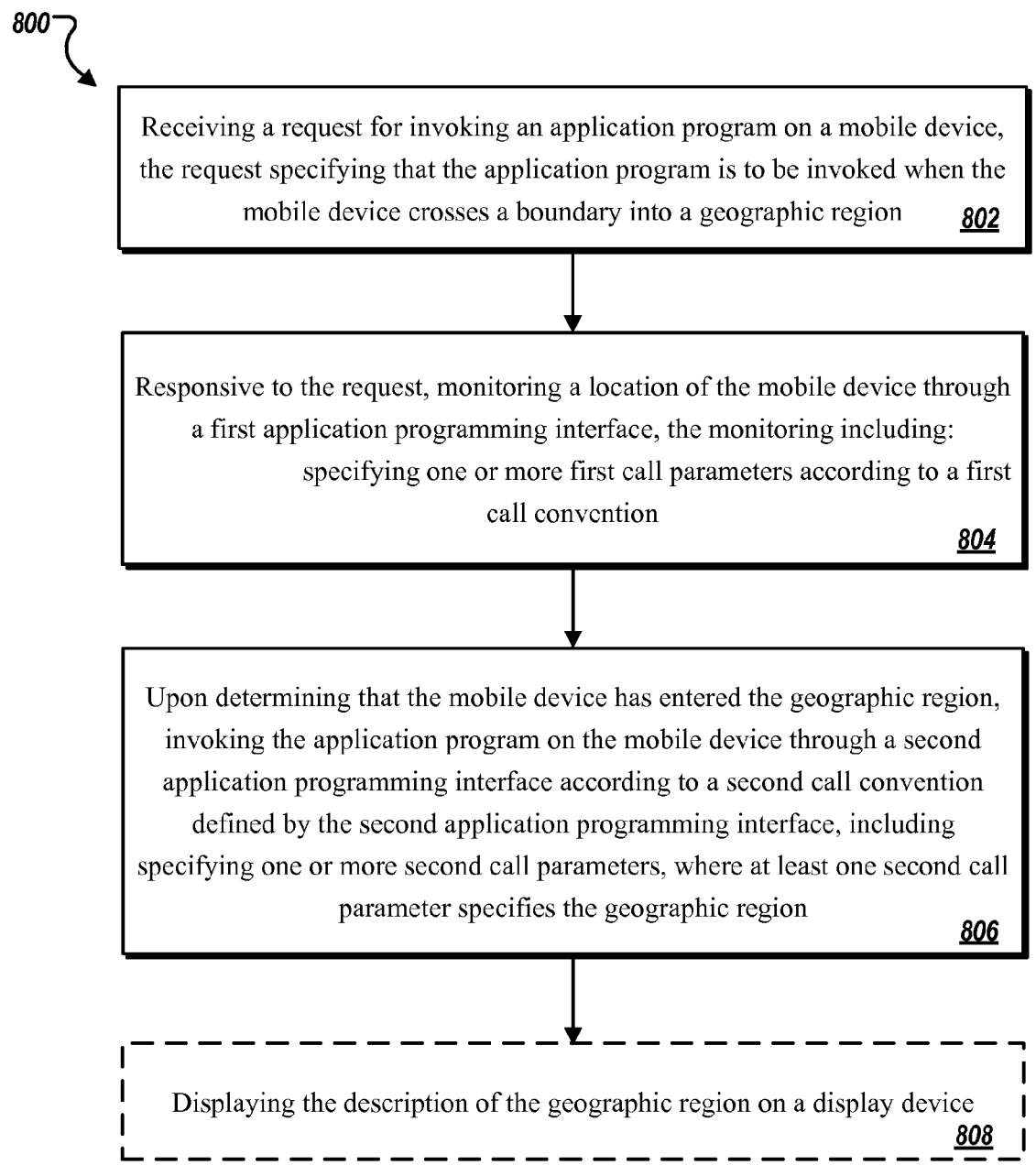
FIG. 8 is a flowchart illustrating an exemplary process for monitoring a location of a mobile device through an exemplary monitoring API.

Mobile device 100 can invoke or notify (710) application program 106 upon determining that mobile device 100 entered or exited the geographic region. Pseudo code of interfaces of methods to be invoked when mobile device 100 enters or exits the geographic region is listed below in listings (9) and (10), respectively.

void locationManager ((9)
LocationManager manager;
didEnterRegion (Region region));
void locationManager ((10)
LocationManager manager;
didExitRegion (Region region));

FIG. 8 is a flowchart illustrating exemplary process 800 for monitoring a location of a mobile device through an exemplary monitoring API. For convenience, exemplary process 800 will be described in reference to mobile device 100 that implements process 800.

Mobile device 100 can receive (802) a request for invoking or notifying application program 106 on mobile device 100. The request can specify that application program 106 is to be invoked or notified when mobile device 100 crosses a geofence into a geographic region. Responsive to the request, mobile device 100 can monitor (804) a location of mobile device 100 through an API. Monitoring the location can include specifying one or more first call parameters according to a first calling convention defined by the API, where at least one first call parameter specifies the geographic region. At least one first call parameter can specify a tolerance distance, mobile device 100 crossing the boundary into the geographic region if mobile device 100 is at least the tolerance distance deep into the geographic region.

Monitoring the location can also include determining whether mobile device 100 has entered the geographic region. Determining whether mobile device 100 has entered the geographic region can include determining whether mobile device 100 has entered the geographic region through the API, including specifying one or more third call parameters according to a third calling convention defined by the API, wherein at least one third call parameter specifies coordinates of a current location of mobile device 100.

Upon determining that mobile device 100 has entered the geographic region, mobile device 100 can invoke (806) or notify application program 106 on mobile device 100 through the API according to a second calling convention defined by the API. Mobile device 100 can specify one or more second call parameters, where at least one second call parameter specifies the geographic region.

Optionally, once application program 106 is invoked or notified, mobile device 100 can display (808) a user interface of application program 106 on a display device (e.g., display device 530).

Mobile device 100 can receive a request for terminating application program 106 on mobile device 100, upon detecting that mobile device 100 has exited the geographic region. Responsive to the request, mobile device 100 can monitor a location of mobile device 100 through the API, the monitoring including specifying one or more fourth call parameters according to a fourth calling convention defined by the API, where at least one fourth call parameter specifies the geographic region. Upon detecting that mobile device 100 has exited the geographic region based on the monitoring, mobile device can terminate application program 106 on mobile device 100.

Exemplary Mobile Device Architecture

Figure 9:
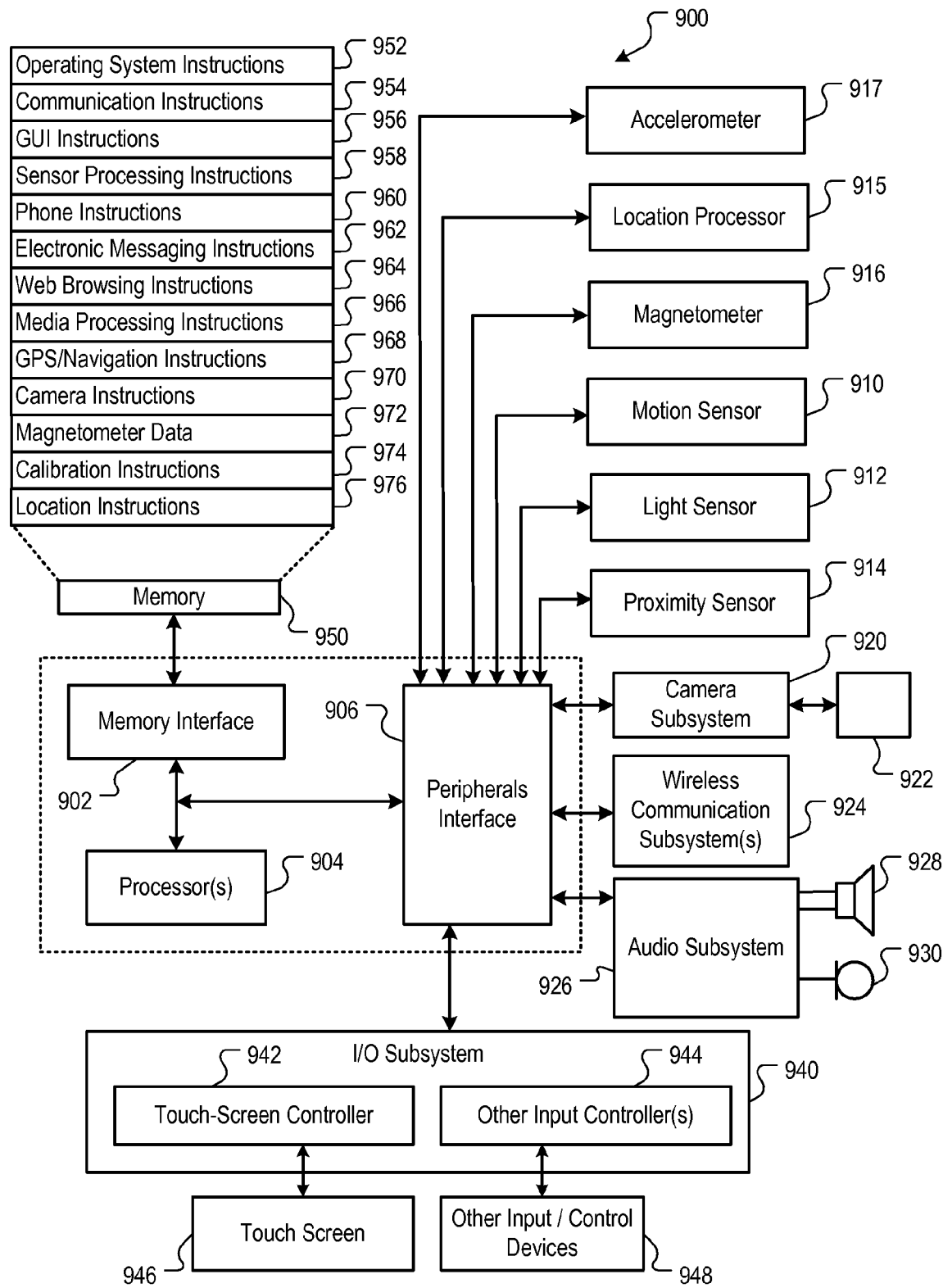
FIG. 9 is a block diagram illustrating an exemplary device architecture of a mobile device implementing the features and operations described in reference to FIGS. 1-8.

FIG. 9 is a block diagram of an exemplary architecture 900 for the mobile devices of FIGS. 1-8. A mobile device can include memory interface 902, one or more data processors, image processors and/or processors 904, and peripherals interface 906. Memory interface 902, one or more processors 904 and/or peripherals interface 906 can be separate components or can be integrated in one or more integrated circuits. Processors 904 can include application processors (APs) and baseband processors (BPs). The various components in mobile device 100, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Accelerometer 917 can also be connected to peripherals interface 906 to provide data that can be used to determine change of speed and direction of movement of the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a Wi-Fi or WiMax network, and a Bluetooth network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions.

I/O subsystem 940 can include touch screen controller 942 and/or other input controller(s) 944. Touch-screen controller 942 can be coupled to a touch screen 946 or pad. Touch screen 946 and touch screen controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch screen 946; and a pressing of the button for a second duration that is longer than the first duration may turn power to mobile device 100 on or off. The user may be able to customize a functionality of one or more of the buttons. The touch screen 946 can, for example, also be used to implement virtual or soft buttons and/or a keyboard.

In some implementations, mobile device 100 can present recorded audio and/or video files, such as MP3, AAC, and MPEG files. In some implementations, mobile device 100 can include the functionality of an MP3 player, such as an iPod™. Mobile device 100 may, therefore, include a pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; camera instructions 970 to facilitate camera-related processes and functions; magnetometer data 972 and calibration instructions 974 to facilitate magnetometer calibration. The memory 950 may also store other software instructions (not shown), such as security instructions, web video instructions to facilitate web video-related processes and functions, and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950. Memory 950 can include location instructions 976 that can be used to transmit a current location to an access point, and to determine an estimated current location based on location data associated with access points to which the mobile device is within a communication range.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of the mobile device may be implemented in hardware and/or in software, including in one or more signal processing and/or application specific integrated circuits.

Exemplary Operating Environment

Figure 10:
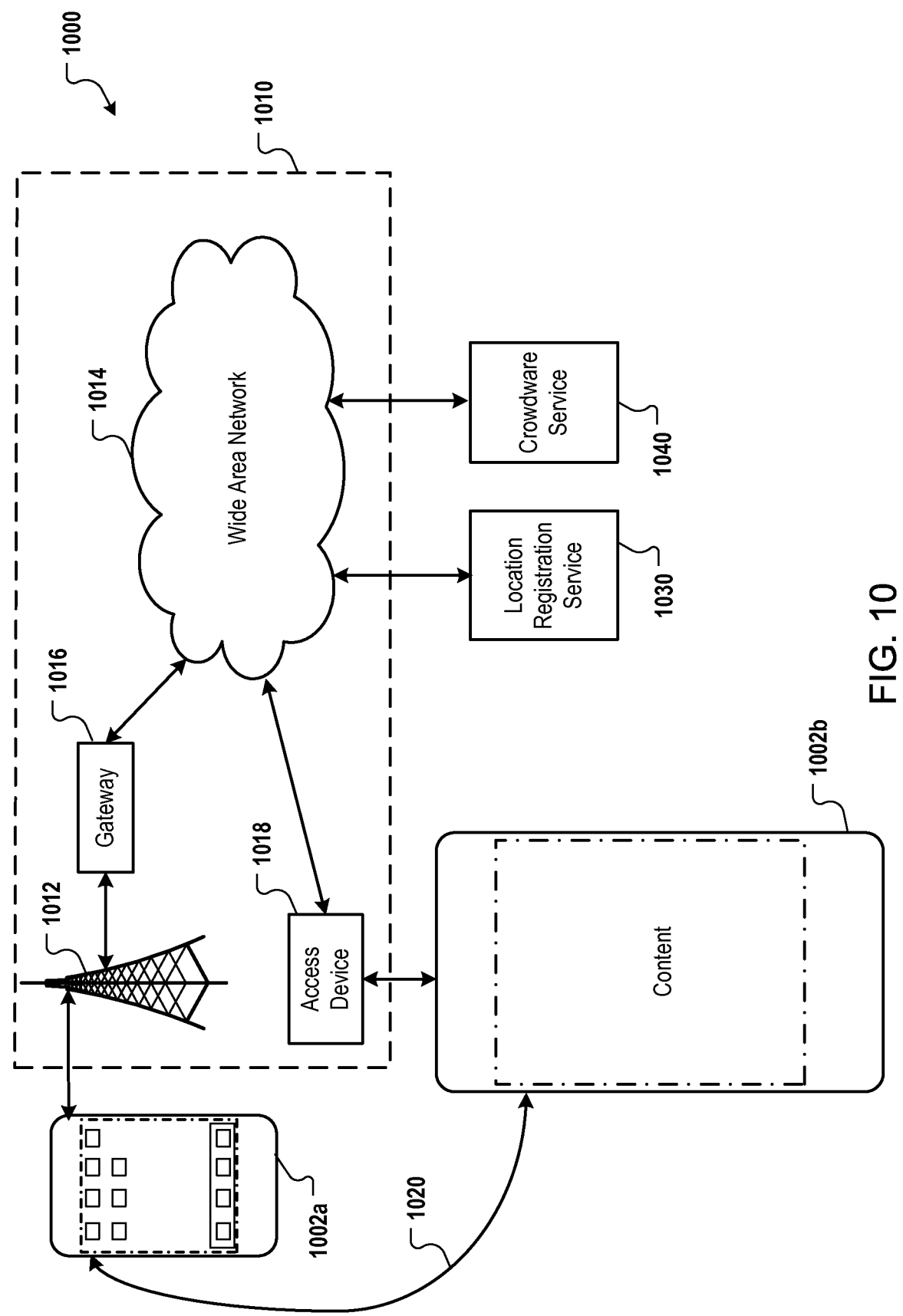
FIG. 10 is a block diagram of an exemplary network operating environment for the mobile devices of 1-9.

FIG. 10 is a block diagram of an exemplary network operating environment 1000 for the mobile devices of FIGS. 1-9. Mobile devices 1002a and 1002b can, for example, communicate over one or more wired and/or wireless networks 1010 in data communication. For example, a wireless network 1012, e.g., a cellular network, can communicate with a wide area network (WAN) 1014, such as the Internet, by use of a gateway 1016. Likewise, an access device 1018, such as an 802.11g wireless access device, can provide communication access to the wide area network 1014.

In some implementations, both voice and data communications can be established over wireless network 1012 and the access device 1018. For example, mobile device 1002a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1012, gateway 1016, and wide area network 1014 (e.g., using Transmission Control Protocol/Internet Protocol (TCP/IP) or User Datagram Protocol (UDP)). Likewise, in some implementations, the mobile device 1002b can place and receive phone calls, send and receive e-mail messages, and retrieve electronic documents over the access device 1018 and the wide area network 1014. In some implementations, mobile device 1002a or 1002b can be physically connected to the access device 1018 using one or more cables and the access device 1018 can be a personal computer. In this configuration, mobile device 1002a or 1002b can be referred to as a "tethered" device.

Mobile devices 1002a and 1002b can also establish communications by other means. For example, wireless device 1002a can communicate with other wireless devices, e.g., other mobile devices 1002a or 1002b, cell phones, etc., over the wireless network 1012. Likewise, mobile devices 1002a and 1002b can establish peer-to-peer communications 1020, e.g., a personal area network, by use of one or more communication subsystems, such as the Bluetooth™ communication devices. Other communication protocols and topologies can also be implemented.

The mobile device 1002a or 1002b can, for example, communicate with one or more services 1030 and 1040 over the one or more wired and/or wireless networks. For example, one or more location registration services 1030 can determine one or more identifiers of wireless access gateways associated with a geographic region, and provide the one or more identifiers to mobile devices 1002 for registration in association with a baseband subsystem.

Crowdware service 1040 can, for example, provide location-based API such that users of mobile device 1002 can develop location-based application programs The application programs (e.g., application program 106) can be provided for download to mobile device 1002.

Mobile device 1002a or 1002b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1002a or 1002b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention. For example, cells in a communication network are represented as hexagons in the figures. The actual shape of a cell can vary.

What is claimed is:

1. A computer implemented method performed by a mobile device, comprising:

receiving, on the mobile device, a request for configuring a geographic region, the geographic region being associated with an application program of an application subsystem of the mobile device to be invoked when the mobile device determines that it has entered into the geographic region;

in response to the request, configuring the geographic region through an application programming interface, the configuring including specifying one or more first call parameters according to a first calling convention defined by the application programming interface, where at least one first call parameter specifies a center of the geographic region;

in response to configuring the geographic region, registering, on the mobile device, identifiers corresponding to one or more wireless access gateways with a location monitoring program on the mobile device;

in response to registering the identifiers, placing, by the mobile device, the application program in a standby mode and suspending components of the application subsystem;

monitoring, using a baseband subsystem of the mobile device and the location monitoring program, a current location of the mobile device with respect to the one or more wireless access gateways, the location monitoring program includes comparing the registered identifiers of the one or more wireless access gateways with a location of the mobile device via the baseband subsystem of the mobile device;

in response to the monitoring, determining, based upon the comparing the registered identifiers of the one or more wireless access gateways with a location of the mobile device via the baseband subsystem of the mobile device, that the mobile device has entered the geographic region;

in response to the determining that the mobile device has entered the geographic region, notifying the application subsystem, by the location monitoring program on the mobile device, that the application program is to be invoked; and in response to notifying the application subsystem, invoking the application program by moving the application program from the standby mode to an active mode on the mobile device.

2. The computer implemented method of claim 1, wherein the center is a centroid of the geographic region.

3. The computer implemented method of claim 1, wherein at least one first call parameter specifies a radius of the geographic region.

4. The computer implemented method of claim 3, wherein determining that the mobile device has entered the geographic region includes determining that a current distance between the mobile device and the center is smaller than the radius.

5. The computer implemented method of claim 1, wherein at least one first call parameter specifies a description of the geographic region.

6. The computer implemented method of claim 1, wherein configuring the geographic region further includes determining a monitoring threshold, including specifying at least one second call parameters according to a second calling convention defined by the application programming interface, where at least one second call parameter specifies a monitoring range of the mobile device.

7. A computer implemented method performed on a mobile device, comprising:

receiving, on the mobile device, a request for invoking an application program with an application subsystem on the mobile device, the request specifying that the application program is to be invoked by activated the application program from a standby mode to an active mode when the mobile device at least partially crosses a boundary into a geographic region;

responsive to the request, monitoring, with a baseband subsystem and a location monitoring program on the mobile device, a location of the mobile device through an application programming interface, the application program being in the standby mode during the monitoring, the monitoring including:

specifying one or more first call parameters according to a first calling convention defined by the application programming interface, where at least one first call parameter specifies the geographic region;

comparing identifiers of one or more wireless access gateways registered on the mobile device with a location of the mobile device via the baseband subsystem of the mobile device;

in response to the comparing, determining whether the mobile device has entered the geographic region;

in response to determining that the mobile device has entered the geographic region, notifying the application subsystem, by the location monitoring program on the mobile device, that the application is to be invoked; and invoking the application program on the mobile device by moving the application program from the standby mode to the active mode through the application programming interface according to a second calling convention defined by the application programming interface, including specifying one or more second call parameters, where at least one second call parameter specifies the geographic region.

8. The computer implemented method of claim 7, wherein at least one first call parameter specifies a tolerance distance, the mobile device crossing the boundary into the geographic region if the mobile device is at least the tolerance distance deep into the geographic region.

9. The computer implemented method of claim 7, wherein determining whether the mobile device has entered the geographic region includes determining whether the mobile device has entered the geographic region through the application programming interface, including specifying one or more third call parameters according to a third calling convention defined by the application programming interface, wherein at least one third call parameter specifies coordinates of a current location of the mobile device.

10. The computer implemented method of claim 7, further comprising:

receiving a request for terminating the application program on the mobile device upon detecting that the mobile device has exited the geographic region;

responsive to the request for terminating the application, monitoring a further location of the mobile device through the application programming interface, the monitoring including specifying one or more fourth call parameters according to a fourth calling convention defined by the API, where at least one fourth call parameter specifies the geographic region; and upon detecting that the mobile device has exited the geographic region based on the monitoring, terminating the application program on the mobile device.

11. A system comprising:

a mobile device configured to perform operations comprising:

receiving, on the mobile device, a request for configuring a geographic region, the geographic region being associated with an application program of an application subsystem of the mobile device to be invoked when the mobile device determines that it has entered into the geographic region;

in response to the request, configuring the geographic region through an application programming interface, the configuring including specifying one or more first call parameters according to a first calling convention defined by the application programming interface, where at least one first call parameter specifies a center of the geographic region;

in response to configuring the geographic region, registering, on the mobile device, identifiers corresponding to one or more wireless access gateways with a location monitoring program on the mobile device;

in response to registering the identifiers, placing, by the mobile device, the application program in a standby mode and suspending components of the application subsystem;

monitoring, using a baseband subsystem of the mobile device and the location monitoring program, a current location of the mobile device with respect to the one or more wireless access gateways, the location monitoring program includes comparing the registered identifiers of the one or more wireless access gateways with a location of the mobile device via the baseband subsystem of the mobile device;

in response to the monitoring, determining, based upon registered identifiers of the one or more wireless access gateways with a location of the mobile device via the baseband subsystem of the mobile device, that the mobile device has entered the geographic region;

in response to the determining that the mobile device has entered the geographic region, notifying the application subsystem, by the location monitoring program on the mobile device, that the application program is to be invoked; and in response to notifying the application subsystem, invoking the application program by moving the application program from the standby mode to an active mode on the mobile device.

12. The system of claim 11, wherein the center is a centroid of the geographic region.

* * * * *

UNITED STATES PATENT AND TRADEMARK OFFICE
CERTIFICATE OF CORRECTION

| | | |
|---|---|---|
| PATENT NO. | : 9,210,529 B2 | Page 1 of 1 |
| APPLICATION NO. | : 14/137607 | |
| DATED | : December 8, 2015 | |
| INVENTOR(S) | : Ronald Keryuan Huang et al. | |

It is certified that error appears in the above-identified patent and that said Letters Patent is hereby corrected as shown below:

In The Claims

Column 21, Line 17; In Claim 11, after "upon" insert -- the comparing the --.

Signed and Sealed this
Twenty-sixth Day of April, 2016

Michelle K. Lee
*Director of the United States Patent and Trademark Office*